(12) United States Patent
Winn et al.

(10) Patent No.: US 6,887,388 B2
(45) Date of Patent: May 3, 2005

(54) FUEL PUMP/FILTER INTEGRATION

(75) Inventors: David E. Winn, Columbus, IN (US); Larry J. Tipton, Kokomo, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/035,047

(22) Filed: Dec. 27, 2001

(65) Prior Publication Data

US 2003/0121865 A1 Jul. 3, 2003

(51) Int. Cl.$^7$ .............................................. B01D 36/26
(52) U.S. Cl. ...................... 210/739; 210/91; 210/172; 210/416.4
(58) Field of Search ............... 210/91, 172, 416.4, 210/739; 123/497, 509

(56) References Cited

U.S. PATENT DOCUMENTS

| | | | |
|---|---|---|---|
| 2,881,749 A | * 4/1959 | Pringham | 123/179.12 |
| 5,231,967 A | 8/1993 | Baltz et al. | 123/497 |
| 5,392,750 A | 2/1995 | Laue et al. | 123/509 |
| 5,642,718 A | 7/1997 | Nakai et al. | 123/497 |
| 5,785,032 A | 7/1998 | Yamashita et al. | 123/509 |
| 5,860,796 A | 1/1999 | Clausen | 417/423.9 |
| 5,915,926 A | 6/1999 | Janik et al. | 417/44.2 |
| 6,361,684 B1 | * 3/2002 | Hawkins et al. | 210/91 |

* cited by examiner

*Primary Examiner*—Matthew O. Savage
(74) *Attorney, Agent, or Firm*—Howard & Howard

(57) ABSTRACT

A vehicle having an engine, a fuel tank, and a pump encased in a housing. The pump is in fluid communication with the fuel tank and the engine. A filter is disposed intermediate the fuel pump and the engine. An electrical conductor having an inoperative position and an operative position is operatively associated with the pump. When the filter is installed, the electrical conductor contacts the pump housing to ground the pump allowing operation thereof.

14 Claims, 1 Drawing Sheet

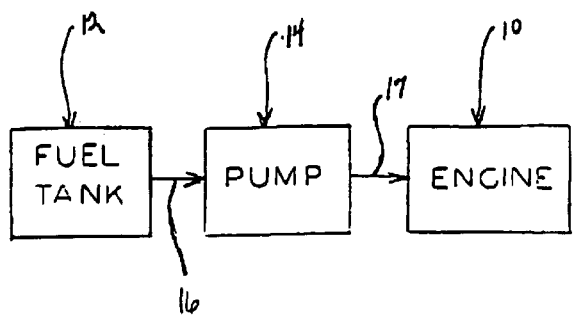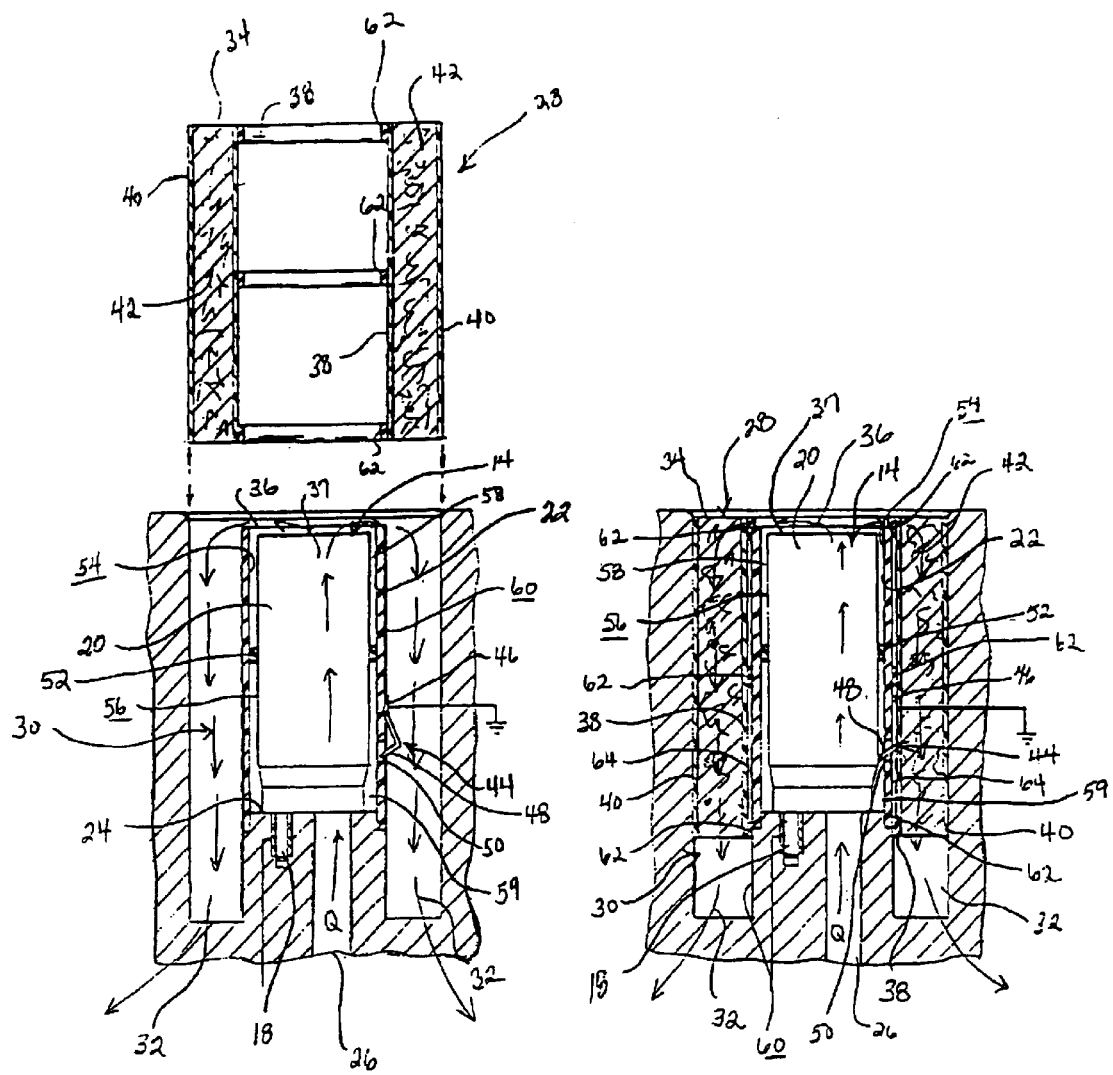

FUEL PUMP/FILTER INTEGRATION

BACKGROUND OF THE INVENTION

1. Field of the Invention

The present invention relates to a method and apparatus for preventing non-filtered fuel from reaching an engine. More particularly, the present invention relates to a method and apparatus for preventing operation of an engine when a fuel filter is not installed.

2. Description of the Related Art

Engines are typically connected to a fuel storage tank via a fluid system including a fuel pump for conveying fuel from the tank to the engine. In a fluid system such as one located in a vehicle, a filter is disposed in the fuel line extending between the fuel tank and the engine at a location upstream from the engine. The filter functions to remove contaminants from the fuel which can cause damage to the internal components of the engine. Over time, a fuel filter can become obstructed and cause substandard vehicle operation. When this occurs, the vehicle operator may be tempted to remove the fuel filter to increase vehicle performance. If the fuel filter is removed, contaminants located within the fuel are not removed and are allowed to circulate through the vehicle's engine. The free flow of contaminants through the engine can cause problems including collection of particles within the valves of the engine, clogging of fuel injector jets, or scoring of the internal surfaces of the engine. Furthermore, if the vehicle has been operated with the fuel filter removed, service providers may be reluctant to honor warranties for damaged parts.

What is desired is a safe and simple method and apparatus for preventing non-filtered fuel from reaching an engine.

SUMMARY OF THE INVENTION

The present invention provides a method and apparatus for preventing non-filtered fuel from reaching an engine of a vehicle. The vehicle includes a fuel storage tank in fluid communication with the engine. A fuel pump is in fluid communication with the fuel tank and the engine. Furthermore, a fuel filter is positioned in the fluid flow path intermediate the engine and the fuel storage tank. An electrical conductor is operatively associated with the fuel filter such that when the fuel filter is installed, the electrical conductor grounds the fuel pump. When the fuel pump is grounded, the electrical circuit which energizes the fuel pump is closed, allowing operation of the pump and, consequently, the engine.

The fuel filter of one embodiment of the present invention is in the shape of a hollow cylinder and is disposed in the fluid flow path between the fuel tank and engine of the vehicle. The filter is received in a housing which has an electrical conductor such as a spring clip with one end of the clip being secured to a portion of the filter housing and to a grounded portion of the electrical system of the vehicle. The fuel pump is grounded to its outer housing. When the filter is installed into the filter housing, the spring clip contacts the outer housing of the pump, thus grounding the fuel pump and allowing operation thereof. When the fuel filter is removed from its installed position, the spring clip loses contact with the outer housing of the fuel pump, thus opening the circuit to prevent operation of the fuel pump.

The invention, in one form thereof, comprises a fuel distribution system having a fuel reservoir and an electrically operated fuel pump with an electrical circuit. A fluid flow path extends between the fuel reservoir, the fuel pump, and the engine. A fuel filter is selectively disposed in the fluid flow path. An electrical conductor selectively closes the electrical circuit of the fuel pump to allow operation thereof. The electrical conductor includes an inoperative position and an operative position, whereby the electrical circuit of the fuel pump is closed when the electrical conductor achieves the operative position. The electrical conductor maintains the operative position when the fuel filter is disposed in the fluid flow path, and maintains the inoperative position when the fuel filter is removed from the fluid flow path.

The invention, in another form thereof, comprises an apparatus for preventing non-filtered fuel from reaching an engine connected via a fluid flow path to a fuel tank. The apparatus includes an electrically operated fuel pump in fluid communication with the fuel tank and the engine. A fuel filter is selectively disposed in the fluid flow path upstream of the engine. An electrical conductor connected to ground has an inoperative position and an operative position whereby the electrical conductor grounds the fuel pump in its operative position. When the filter is installed, the electrical conductor maintains the operative position, whereby the fuel pump is operable. When the filter is removed, the electrical conductor maintains the inoperative position.

The invention, in a further form thereof, comprises an apparatus for preventing non-filtered fuel from reaching an engine of a vehicle. The apparatus includes a fuel tank and an electrically operated fuel pump having a housing and an electrical circuit. A fluid flow path extends between the fuel tank and the engine, with a fuel filter selectively disposed therein. The apparatus of this form of the present invention further includes an electrically conductive means for selectively closing the electrical circuit of the pump, wherein the conductive means closes the electrical circuit of the pump when the fuel filter is disposed in the fluid flow path.

The invention, in another form thereof, comprises a method of preventing operation of a vehicle having an engine when a fuel filter is not operably positioned in a fluid flow path downstream from the fuel pump. The method of this form of the current invention includes the steps of: providing an electrically operated fuel pump having an open electrical circuit, and providing an electrical conductor moveable to complete the electrical circuit when the fuel filter is operably positioned in the fluid flow path.

The present invention advantageously prohibits fuel pump operation if a fuel filter is not installed.

BRIEF DESCRIPTION OF THE DRAWINGS

Above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a schematic view of the fluid flow path from a fuel tank to an engine;

FIG. 2 is a sectional, exploded view of the fuel pump and filter housing; and

FIG. 3 is a sectional view of the fuel pump and filter housing of FIG. 2, with the filter operatively installed.

Corresponding reference characters indicate corresponding parts throughout the several views. Although the drawings represent embodiments of the present invention, the drawings are not necessarily to scale and certain features may be exaggerated to better illustrate and explain the present invention.

DETAILED DESCRIPTION OF THE PRESENT INVENTION

Referring to FIG. 1, engine 10 is used to operate vehicles such as, e.g., cars, trucks, or recreational vehicles. To operate engine 10, fuel must be supplied to engine 10 from fuel tank 12. Pump 14 is utilized between fuel tank 12 and engine 10 to draw fuel from fuel tank 12 and to deliver it to engine 10. Fuel travels along a fluid flow pathway schematically illustrated by arrows 16 and 17 in FIG. 1. Generally, fuel tank 12 is located near one end of the vehicle while engine 10 is disposed at the opposite end thereof. Fuel pump 14 may be placed at any position between fuel tank 12 and engine 10 and may be mounted to any suitable component of the vehicle including the firewall, vehicle frame, engine 10, or otherwise within the engine compartment.

Fuel pump 14 is an electrically operated lift pump forming a part of an electrical circuit including positive terminal 18 (FIGS. 2 and 3). Fuel pump 14 is surrounded by housing 20 which is constructed from any suitable conductive metal such as, e.g., steel or aluminum. Rather than being directly connected to a negative terminal, pump 14 is grounded to fuel pump housing 20. Fuel pump 14 is operable to supply a sufficient amount of fuel to engine 10 to maintain engine operation and also to maintain the appropriate amount of pressure in fluid line 17 between engine 10 and pump 14. In one embodiment, fuel pump 14 is disposed within plastic standpipe 22. Extending from the lower edge 24 of standpipe 22 through the lower edge of pump 14 is fuel line 26 through which fluid flows from tank 12 into pump 14.

Clean fuel is an important part of engine operation as engine 10 has several jets and passages which could be clogged if the engine fuel contained contaminants. In one embodiment, filter 28 is installed in filter housing 30 (FIGS. 2 and 3) downstream from fuel pump 14 to filter fuel exiting fuel pump 14 and prevent fuel contaminants from entering engine 10. A portion of filter housing 30 is defined by standpipe 22. Fuel enters fuel pump 14 and is thereafter pumped through filter 28 to remove contaminants therein. After reaching lower portion 32 of filter housing 30, fuel is thereafter supplied to engine 10. As illustrated in FIGS. 2 and 3, fuel flow Q (from fuel tank 12) enters fuel pump 14 via fuel line 26. Fuel is then pumped through fuel pump 14 to fuel passageway 36, top edge 34 of filter 28, and finally into filter 28. After traveling through filter 28, the fuel exits filter 28 through lower portion 32 of filter housing 30 and is thereafter conveyed to engine 10 (FIG. 1). Fuel flow Q is schematically depicted as exiting filter housing 30 at lower housing portion 32. Various structures may be utilized to thereafter conduct fuel to engine 10 (FIG. 1), including a single fuel line in fluid communication with lower housing portion 32.

Referring to FIGS. 2 and 3, filter 28 has a hollow cylindrical shape with mesh filter material 42 interposed between inner housing 38 and outer housing 40. The outer diameter of inner housing 38 and the inner diameter of outer housing 40 provide a framework for supporting and protecting mesh material 42 through which fuel passes. Mesh material 42 includes open spaces sized to permit fuel flow therethrough while trapping solid contaminants therein. The contaminants collected by the fibrous material of filter 28 are thus prevented from entering engine 10. Contaminants trapped by filter 28 include, e.g., dust, dirt, metallic particles and various other materials which could cause damage to engine 10.

In one preferred embodiment, filter 28 is installed in filter housing 30 adjacent to and surrounding plastic standpipe 22 which surrounds fuel pump 14. In the illustrated embodiment, filter 28 is mounted in the fuel flow path between fuel pump 14 and engine 10 with the fuel passing through filter 28 prior to entry into engine 10. However, filter 28 may be positioned anywhere along the fluid flow path upstream from the engine. Filter 28 includes inner and outer housing portions 38 and 40 which are constructed from a nonconductive material, such as plastic. Housing portions 38 and 40 may be constructed from lightweight metals such as aluminum, however, in these embodiments, housing portions 38 and 40 must be electrically isolated from spring clip 44 (described hereinbelow).

The lower edge of fuel pump housing 20 is connected to positive terminal 18 and fuel pump 14 is electrically connected thereto. Fuel pump 14 is grounded to its housing 20 which is selectively grounded by an electrical conductor. In one embodiment, the electrical conductor for selectively grounding fuel pump 14 comprises spring clip 44. Spring clip 44 is grounded at 46 and is secured to filter housing 30. Spring clip 44 is operable to maintain one of a first inoperative position and a second operative position as illustrated in FIGS. 2 and 3, respectively. Spring clip 44 thus controls the operation of pump 14 and, consequently, engine 10. As illustrated in FIG. 2, with filter 28 removed from filter housing 30, spring clip 44 maintains an inoperative position in which clip 44 does not contact pump housing 20, and, thus pump 14 is not grounded, and, therefore, is inoperable. With filter 28 installed (FIG. 3), spring clip 44 is forced into an operative position in contact with outer surface 56 of pump housing 20 (to which pump 14 is grounded), thus grounding fuel pump 14. As stated above, spring clip 44 is connected to a grounded portion of the vehicle and, therefore, is operable to close the fuel pump circuit.

Spring clip 44 is constructed from a conductive material such as spring metal and is secured at end 46 to surface 60 of standpipe 22 by any suitable affixing means, e.g., welding, or an adhesive bond. End 48 of spring clip 44 is free to advance through aperture 50 in plastic standpipe 22. Referring to FIG. 3, when filter 28 is installed properly in filter housing 30, the inner diameter surface of inner housing 38 contacts spring clip 44, and forces end 48 of spring clip 44 (against the biasing force of the spring clip) through aperture 50 and into contact with fuel pump housing 20. With spring clip 44 contacting fuel pump housing 20, pump 14 is grounded and the fuel pump circuit is closed, allowing operation of pump 14. If filter 28 is removed from filter housing 30 as shown in FIG. 2, spring clip 44 returns to it its undeformed position, and end 48 of spring clip 44 no longer contacts housing 20. With filter 28 removed, the fuel pump circuit opens, ceasing operation of pump 14 and, consequently, engine 10.

O-ring 52 is disposed between inner surface 54 of standpipe 22 and outer surface 56 of pump housing 20. O-ring 52 prohibits fuel passage thereby, and also wipes debris from outer surface 56 of housing 20 when fuel pump 14 is removed from plastic standpipe 22. Space 59 is defined by the lower portion of pump housing 20, stand pipe 22, and O-ring 52. When fuel is delivered to upper end 37 of pump 14, a portion of the fuel may flow into space 58 defined by the upper portion of pump housing 20, standpipe 22, and O-ring 52, however O-ring 52 prevents such fuel from entering space 59 and from contacting the area in which the electrical connection between pump housing 20 and spring clip 44 is formed.

Fuel entering filter 28 may be inadvertently directed to the area between the inner diameter of inner fuel filter housing 38 and outer surface 60 of filter housing 30. To protect the electrical connection between fuel pump housing 20 and spring clip 44, seals 62 (FIG. 3) are circumferentially disposed about the inner diameter surface of inner housing 38 of filter 28 (FIG. 2). Seals 62 contact standpipe 22 of fuel filter housing 30 to create enclosed space 64 (FIG. 3) between the inner diameter of inner housing 38 and outer surface 60 of standpipe 22. Seals 62 prevent fuel from entering space 64, thereby further isolating the electrical contact point between pump housing 20 and spring clip 44.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A fuel distribution system for use with an engine, said system comprising:

a fuel reservoir;

electrically operated fuel pump having an electrical circuit and a fuel pump housing, said fuel pump being grounded to said fuel pump housing;

a fluid flow path disposed between said fuel reservoir and an engine, said fuel pump disposed in said fluid flow path;

a fuel filter selectively disposed in said fluid flow path; and an electrical conductor for selectively closing the electrical circuit of said pump to allow operation thereof, said electrical conductor having an inoperative position and an operative position, whereby the electrical circuit of said fuel pump is closed when said electrical conductor achieves said operative position, said electrical conductor maintaining said operative position when said fuel filter is disposed in said fluid flow path, said electrical conductor maintaining said inoperative position when said fuel filter is removed from said fluid flow path, and wherein said electrical conductor contacts said pump housing in said operative position.

2. The fuel distribution system of claim 1, wherein said electrical conductor is a resilient member having two ends, a first one of said ends affixed to a filter housing, a second one of said ends movable between said inoperative position and said operative position, said electrical conductor being grounded.

3. The fuel distribution system of claim 1, wherein said electrical conductor comprises a spring clip.

4. The fuel distribution system of claim 3, wherein said spring clip has two ends, a first one of said ends being affixed to a filter housing, a second one of said ends being moveable between said inoperative position and said operative position, said electrical conductor being grounded.

5. An apparatus for preventing non-filtered fuel from reaching an engine connected via a fluid flow path to a fuel tank, said apparatus comprising:

an electrically operated fuel pump disposed in the fluid flow path, said pump in fluid communication with the fuel tank and the engine, said pump having a housing;

a fuel filter selectively disposed in the fluid flow path, said filter in fluid communication with said fuel tank, said pump, and the engine, said fuel filter being positioned upstream of the engine; and an electrical conductor comprising a spring clip connected to ground, said electrical conductor having an inoperative position and an operative position, whereby said electrical conductor grounds said fuel pump in said operative position, said electrical conductor maintaining said operative position when said fuel filter is disposed in said fluid flow path, said electrical conductor maintaining said inoperative position when said fuel filter is removed from said fluid flow path.

6. The apparatus of claim 5, wherein said spring clip has two ends, a first one of said ends being affixed to a filter housing, a second one of said ends being moveable between said inoperative position and said operative position.

7. The apparatus of claim 5, wherein said fuel pump is grounded to said pump housing, wherein said electrical conductor contacts said pump housing in said operative position, and wherein said electrical conductor is out of contact with said pump housing in said inoperative position.

8. The apparatus of claim 7, further comprising a filter housing sized to accommodate said fuel filter and said fuel pump, wherein insertion of said filter into said filter housing actuates said electrical conductor into said operative position, and wherein removal of said filter allows said electrical conductor to return to said inoperative position.

9. The apparatus of claim 5, further comprising a filter housing sized to accommodate said fuel filter and said fuel pump, wherein insertion of said filter into said filter housing actuates said electrical conductor into said operative position, and wherein removal of said filter allows said electrical conductor to return to said inoperative position.

10. An apparatus for preventing non-filtered fuel from reaching an engine in a vehicle, comprising:

a fuel tank;

an electrically operated fuel pump having a pump housing and an electrical circuit;

a filter housing defining a fluid flow path disposed between said fuel tank and said engine, said fuel pump disposed in said fluid flow path;

a fuel filter selectively disposed in said fluid flow path; electrically conductive means for selectively closing said electrical circuit of said pump to allow operation thereof, wherein said conductive means closes the electrical circuit of said pump when said fuel filter is disposed in said fluid flow path; and wherein said electrically conductive means comprises a resilient member, said resilient member having two ends, a first one of said ends affixed to said filter housing, a second one of said ends being movable between an inoperative position in which the electrical circuit of said fuel pump is open, and an operative position in which the electrical circuit of said fuel pump is closed.

11. The apparatus of claim 10, wherein said pump is electrically grounded to said pump housing.

12. The apparatus of claim 11, wherein said electrically conductive means contacts said pump housing in said operative position.

13. The apparatus of claim 12, wherein said electrically conductive means is electrically rounded to said filter housing.

14. A method of preventing non-filtered fuel from reaching an engine when a fuel filter is not operably positioned in a fluid flow path upstream from the engine, said method comprising:

providing an electrically operated fuel pump having an open electrical circuit and a fuel pump housing, said fuel pump grounded to said housing;

providing an electrical conductor moveable to complete said electrical circuit, said electrical conductor moved into position to complete said electrical circuit when said fuel filter is operably positioned in the fluid flow path; and connecting said electrical conductor to ground.

* * * * *

UNITED STATES PATENT AND TRADEMARK OFFICE
CERTIFICATE OF CORRECTION

PATENT NO. : 6,887,388 B2
DATED : May 3, 2005
INVENTOR(S) : Winn et al.

It is certified that error appears in the above-identified patent and that said Letters Patent is hereby corrected as shown below:

Column 6,
Line 8, replace "claim 7" with -- claim 5 --
Line 14, replace "claim 5" with -- claim 7 --
Line 30, please make a new paragraph beginning with "electrically conductive material"
Line 49, please replace "rounded" with -- grounded --

Signed and Sealed this

Twelfth Day of July, 2005

JON W. DUDAS
*Director of the United States Patent and Trademark Office*